UNITED STATES PATENT OFFICE.

EMIL ABDERHALDEN, OF HALLE-ON-THE-SAALE, GERMANY.

SERUM MIXTURE.

1,191,551.

No Drawing.

Specification of Letters Patent. Patented July 18, 1916.

Application filed August 27, 1915. Serial No. 47,692.

*To all whom it may concern:*

Be it known that I, EMIL ABDERHALDEN, doctor of medicine, professor of physiology, citizen of the German Empire, residing at Halle-on-the-Saale, Kingdom of Prussia, Germany, have invented new and useful Improvements in Serum Mixtures, of which the following is a specification.

This invention relates to methods for determining the particular variety of cancer in an animal affected with a tumor and further relates to new serum mixtures and their production.

More particularly it comprises methods for ascertaining whether or not the cancer of a tumor carrier is biologically related to cancer of known variety, or to an antiserum which has been produced by the known variety of tumor.

In my application Ser. No. 28,195 filed May 14, 1915, I have described new kinds of sera containing protective ferments which have an unusually powerful lysing action on cancerous tissue. These sera are obtained by injecting cancer albumin into an animal, withdrawing serum therefrom before the protective ferments first formed have disappeared, injecting said serum into a fresh animal to produce a serum of augmented strength in protective ferments, and continuing the transference of serum through a series of animals until a serum of the desired potency is secured. The potentiated serum so obtained has the valuable property that if injected into human beings suffering with carcinoma, for instance, it manifests distinct curative effects, as has been demonstrated by many clinical tests. This potentiated serum appears to have a specific destructive (lysing) action only on the particular protein or protein derivative which originally induced its formation. Thus if cancer tissue or any other kind of tissue, or any peptone-mixture obtained from the protein of such tissues, is introduced parenterally (*i. e.* subcutaneously or in intravenously) into animals or human beings, there appear in the serum of the animal or human being, protective ferments which have a selective action upon the particular albumins or peptones introduced. Before using the potentiated serum in the treatment of cancer it is therefore necessary to make sure that the serum to be used corresponds to the particular variety of the albumin in the tumor to be treated. In devising a method for ascertaining whether or not this necessary correspondence existed, the following facts were taken into consideration.

If an animal with a cancerous tumor receives parenterally serum containing substances or protective ferments foreign to its blood but corresponding to said tumor, then the tumor shows swelling and redness, and cutaneous reactions (hyperemia and edema), with such general manifestations as convulsions, fall of temperature, etc., are observed. If however, this serum contains protective ferments, which bear no relation to the variety of the tumor carrier or the tumor carrier to be treated then no reaction takes place.

The serum obtained from the test animals is called "tumor antiserum," in contradistinction to the serum derived from the tumor carrier to be treated. Based on these observations, the following treatment of cancer has been developed.

*Example 1.—Determination of the variety of cancer of the tumor carrier to be treated.*—An animal is treated with cancerous tissue substances of a known variety. Into this animal the serum of the tumor carrier to be treated is introduced. It is then observed whether manifestations as described above develop. If this is the case, then the conclusion is justified that both sera, namely the serum of the tumor carrier and that of the previously treated animal, contain biologically related or identical products. Or the test animal is treated with a tumor antiserum and subsequently inoculated parenterally with the serum of the tumor carrier to be treated, and it is noted whether a reaction sets in or not.

*Treatment of the tumor carrier.*—After it has been determined that the serum of the tumor carrier conforms to a certain antitumor carrier, the tumor carrier to be treated is serum, the tumor carrier to be treated is parenterally inoculated with the antiserum.

The properly selected antiserum manifests distinct curative effects in the tumor carrier, and complete disappearance of cancers of various types has been observed.

I claim:—

1. A method for determining the correspondence of the protective ferments in a given antiserum with the cancer tissue of a tumor carrier, comprising injecting said serum and the serum of said tumor carrier into a test animal to produce characteristic physiological disturbances if the constituents of said two serums are biologically related.

2. A method for determining the particular variety of cancer tissue in a tumor carrier which comprises injecting cancer-tissue substance of a known variety into a test animal and then introducing serum from the tumor carrier into the same animal, and repeating this operation with different cancer-tissue substances of known variety in different test animals until characteristic reactions occur, such as convulsions and fall of temperature which indicate a correspondence, or biological relation, between the serum generated in the test animal and the serum from the tumor carrier, substantially as described.

In testimony whereof I have hereunto set my hand in the presence of two subscribing witnesses.

EMIL ABDERHALDEN.

Witnesses:
RUDOLPH FRICKE,
MARGARETE FRITZCHE.